(12) United States Patent
Kooima et al.

(10) Patent No.: US 6,234,072 B1
(45) Date of Patent: May 22, 2001

(54) GRAIN HUSK CRACKING PLATE

(76) Inventors: John C. Kooima, 2638 310th St.;
Phillip G. Kooima, 2634 310th St.,
both of Rock Valley, IA (US) 51247

(*) Notice: Subject to any disclaimer, the term of this patent is extended or adjusted under 35 U.S.C. 154(b) by 0 days.

(21) Appl. No.: 09/519,753

(22) Filed: Mar. 6, 2000

(51) Int. Cl.$^7$ .............................. A23L 1/00; A23L 1/10; B02B 3/00; A01F 12/18; A01F 12/26

(52) U.S. Cl. .................... 99/519; 99/600; 56/2; 56/14.6; 56/16.6; 460/108; 460/110

(58) Field of Search .............. 99/518–531, 494, 99/516, 600–618; 56/14.5, 14.6, 16.5, 2, 255, 295, DIG. 2, DIG. 17; 460/107–110

(56) References Cited

U.S. PATENT DOCUMENTS

| | | | |
|---|---|---|---|
| 3,945,178 | * | 3/1976 | Delfosse ................... 56/14.6 |
| 4,373,536 | * | 2/1983 | Da Silva ................... 56/14.6 |
| 4,583,354 | * | 4/1986 | Kracl ...................... 56/16.6 |
| 4,796,645 | * | 1/1989 | Kuchar ....................... 56/2 |
| 4,988,326 | * | 1/1991 | Bennett ................... 460/110 |
| 5,076,157 | * | 12/1991 | Satake .................. 99/524 X |
| 5,077,961 | * | 1/1992 | Schumacher, II et al. ..... 56/255 |
| 5,295,629 | * | 3/1994 | Satake et al. ............. 241/57 |
| 5,390,589 | * | 2/1995 | Satake et al. ........... 99/613 X |
| 5,394,792 | * | 3/1995 | Satake et al. ........... 99/617 X |
| 5,413,034 | * | 5/1995 | Satake et al. ............. 99/519 |
| 5,419,252 | * | 5/1995 | Satake et al. ........... 99/524 X |
| 5,678,477 | * | 10/1997 | Satake et al. ............. 99/519 |

* cited by examiner

Primary Examiner—Timothy F. Simone

(57) ABSTRACT

A grain husk cracking plate for attaching to a chopping cylinder housing of a harvester in proximity to a shear bar to crack husks of grain moving through the harvester. The grain husk cracking plate includes a base plate adapted for directing grain through the chopping cylinder housing of the harvester. A pair of side mounting members are mounted to side edges of a base plate. A plurality of blade members are mounted on the top surface of the base plate. Each of the side mounting members has a pair of mounting structures, and each mounting structure comprises a mounting aperture extending through the side mounting member adjacent to the leading edge or the trailing edge of the base plate. Each of the mounting structures may include a threaded fastener coupled to each of the side mounting members. The plurality of blade members may be positioned on a rear portion of the base plate. Each of the blade members may comprise a blade assembly with a base member and an edge member, and the base member has a forward surface with the edge member mounted thereon. The forward surface of the base member may have a depression, with the edge member having a rear portion received in the depression of the base member. The edge member of each blade assembly may be formed of a material with relatively greater hardness than the base member. The edge member of each blade assembly may comprise a carbide material, and the base member of each blade assembly may comprise an iron material.

20 Claims, 4 Drawing Sheets

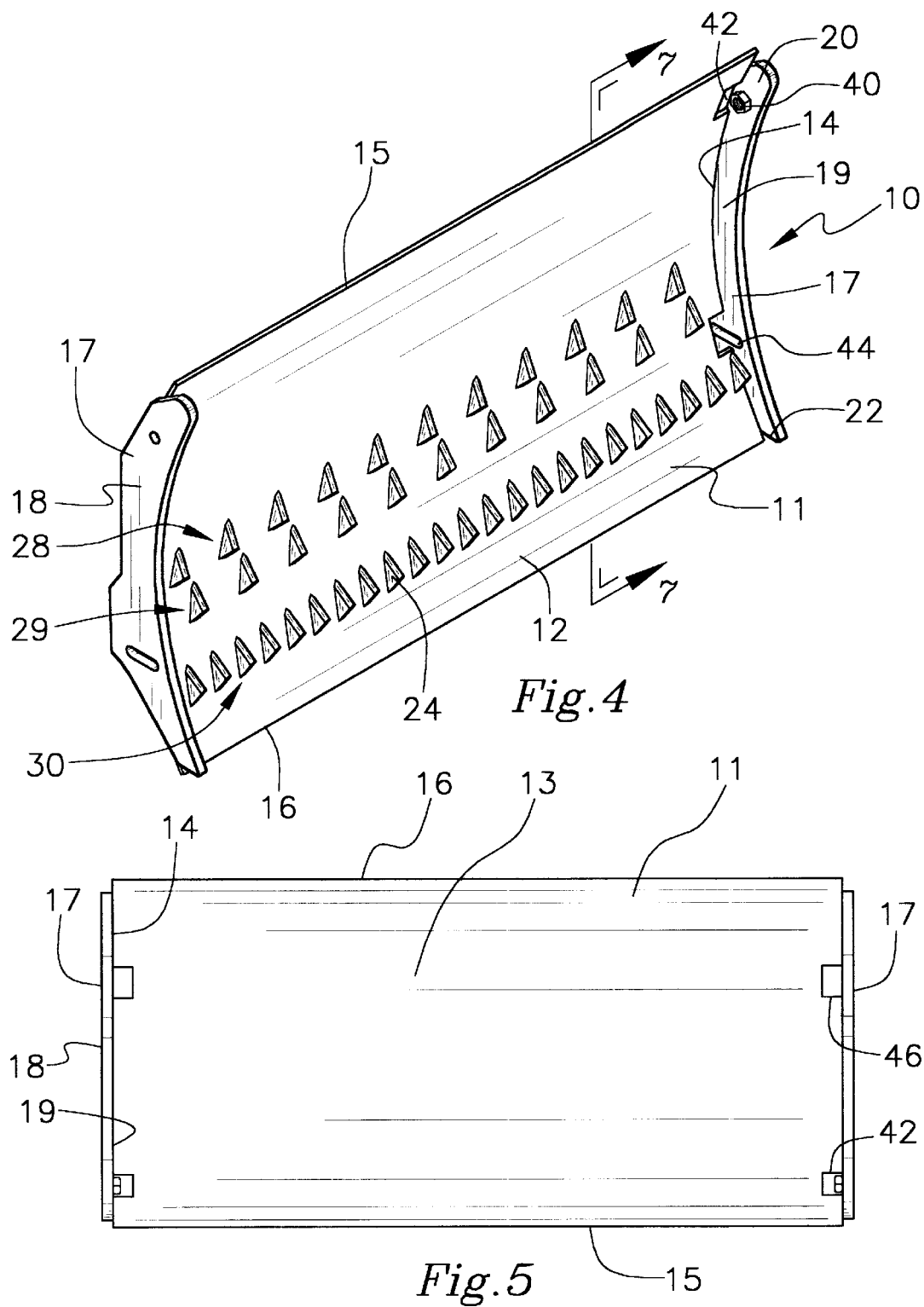

GRAIN HUSK CRACKING PLATE

BACKGROUND OF THE INVENTION

1. Field of the Invention

The present invention relates to grain cracking modules and more particularly pertains to improvements for a grain husk cracking plate for cracking the husk of harvest grains.

2. Description of the Prior Art

The use of grain cracking devices is known in the prior art. These devices "crack" or open the kernel of a feed grain by rupturing the outer husk of the kernel for enhancing the digestibility of the grain by livestock. The most common cracking apparatus comprises a pair of contacting rollers situated in the grain path within a grain harvesting machine. The harvested grain is forced between the rollers while traveling through the harvesting machine. The rollers crush the grain kernels therebetween. However, such roller-type crackers are expensive to maintain and replace, and are vulnerable to damage by foreign matter moving along the grain path with the grain.

Also known are "cracker" plates, which are positioned along one wall of the grain path in the harvesting machines so that grain kernels driven through the grain path strike against and are ruptured by stationary blades on the plate. However, the design of the heretofore known cracker plates has limited their use to only a few types of grain harvesting machines, while these cracker plates have been incompatible with, or inefficient when employed on, other types of harvesting machines. Significantly, the known cracker plates are also completely formed of a uniformly similar material. The cutting or rupturing edges of the blade members are most vulnerable to wear by the flow of grain and foreign matter traveling through the grain path. Significant wear of the cutting edge of the blades generally requires that the entire cracking plate must be replaced, regardless of the condition of the other portions of the plate.

In these respects, the grain husk cracking plate according to the present invention substantially departs from the conventional concepts and designs of the prior art, and in so doing provides an apparatus primarily developed for the purpose of cracking the husk of harvest grains.

SUMMARY OF THE INVENTION

In view of the foregoing disadvantages inherent in the known types of grain cracking modules now present in the prior art, the present invention provides a new grain husk cracking plate construction wherein the same can be utilized for cracking the husk of harvest grains.

The present invention generally comprises a grain husk cracking plate for attaching to a chopping cylinder housing of a harvester in proximity to a shear bar to crack husks of grain moving through the harvester. The grain husk cracking plate includes a base plate adapted for directing grain through the chopping cylinder housing of the harvester. The base plate has a top surface, a pair of opposite side edges, and a leading edge and a trailing edge extending between the side edges. A pair of laterally spaced side mounting members are adapted for mounting to the chopping cylinder housing of the harvester. Each of the side mounting members has an exterior face, and an interior face, with the interior face of each mounting member being mounted to one of the side edges of the base plate. A plurality of blade members are mounted on the top surface of the base plate for cracking the husk of grain traveling through the chopping cylinder housing and striking the blade members.

In one aspect of the invention, each of the side mounting members has a pair of mounting structures for mounting the base plate to a grain harvester. A first one of the pair of mounting structures includes a first mounting aperture extending through the side mounting member adjacent to the leading edge of the base plate. A second one of the pair of mounting structures including a second mounting aperture extending through the side mounting member adjacent to the trailing edge of the base plate. Each of the mounting structures includes a threaded fastener coupled to each of the side mounting members. The threaded fastener has a hole in communication with the mounting aperture. The first mounting aperture is located adjacent to the first end of the side mounting member, and the second mounting aperture is located adjacent to the second end of the side mounting member.

In another aspect of the invention, each of the blade members has a forward edge directed toward the leading edge of the base plate, and a rearward edge directed toward the trailing edge of the base plate. Each of the blade members comprises a blade assembly including a base member and an edge member, with the base member having a forward surface with the edge member mounted thereon. The forward surface of the base member may have a depression, with the edge member having a rear portion received in the depression of the base member. The edge member of each blade assembly may be formed of a material with relatively greater hardness than the base member. The edge member of each blade assembly may comprise a carbide material, and the base member of each blade assembly may comprise an iron material.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new grain husk cracking plate apparatus which has many of the advantages of the grain cracking modules mentioned heretofore and many novel features that result in a new grain husk cracking plate which is not anticipated, rendered obvious, suggested, or even implied by any of the prior art grain cracking modules, either alone or in any combination thereof.

It is another object of the present invention to provide a new grain husk cracking plate which may be easily and efficiently manufactured and maintained in a more economical manner than existing contacting roller grain cracking devices.

It is a further object of the present invention to provide a new grain husk cracking plate which is of a durable and reliable construction, and which has blade members with an enhanced resistance to wear by the grain and foreign matter traveling through the grain path of the harvesting machine.

An even further object of the present invention is to provide a new grain husk cracking plate which is susceptible of a low cost of manufacture with regard to both materials and labor, and which accordingly is then susceptible of low prices of sale to the consuming public, thereby making such grain husk cracking plate economically available to the buying public.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a schematic perspective view of an embodiment of the grain husk cracking plate of the present invention showing optional features of the invention.

FIG. 5 is a schematic bottom view of the present invention as illustrated in FIG. 4.

DESCRIPTION OF THE PREFERRED EMBODIMENT

Figure 1:
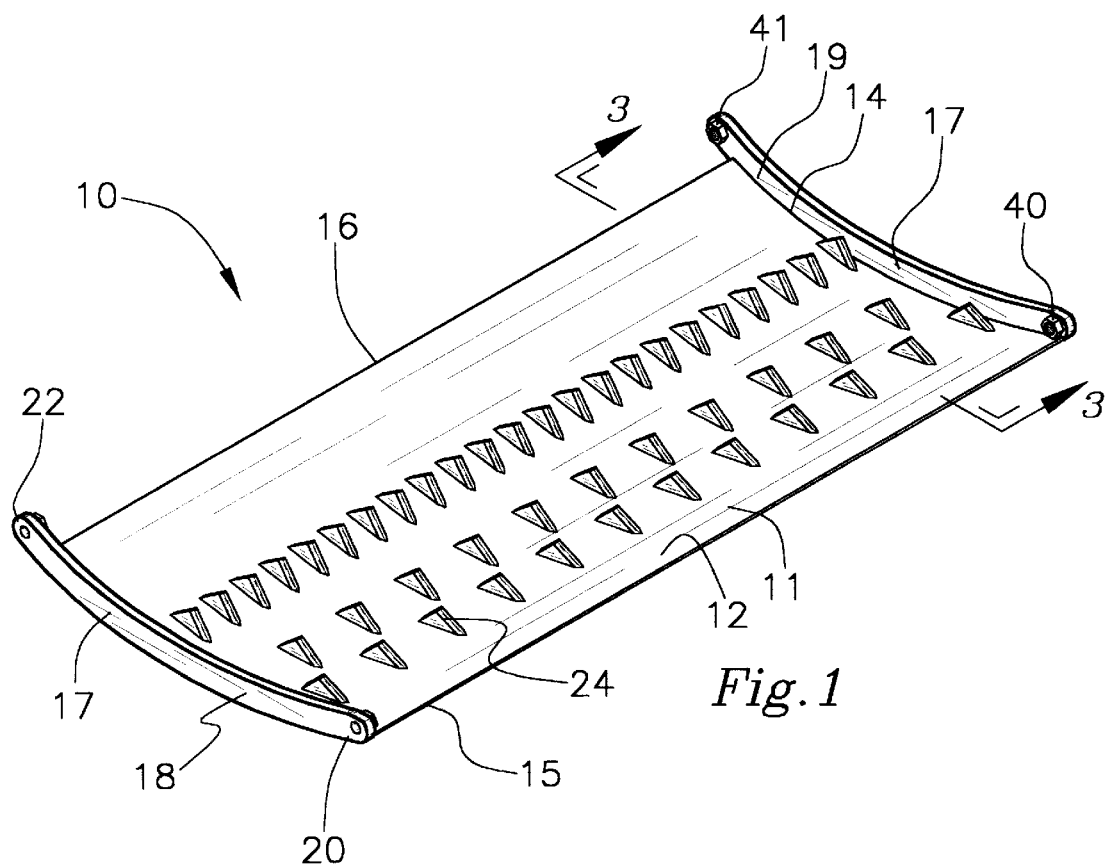
FIG. 1 is a perspective view of a grain husk cracking plate of the invention.
Figure 2:
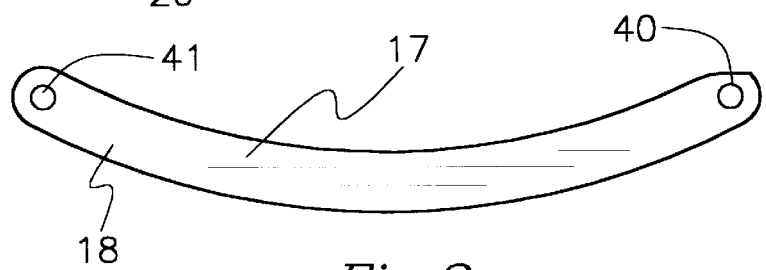
FIG. 2 is a side view of the grain husk cracking plate of FIG. 1.
Figure 3:
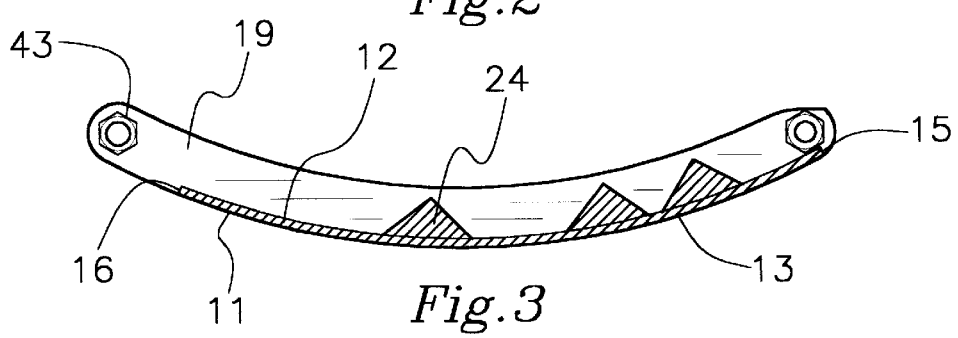
FIG. 3 is a sectional view of the grain husk cracking plate of FIG. 1.
Figure 6:
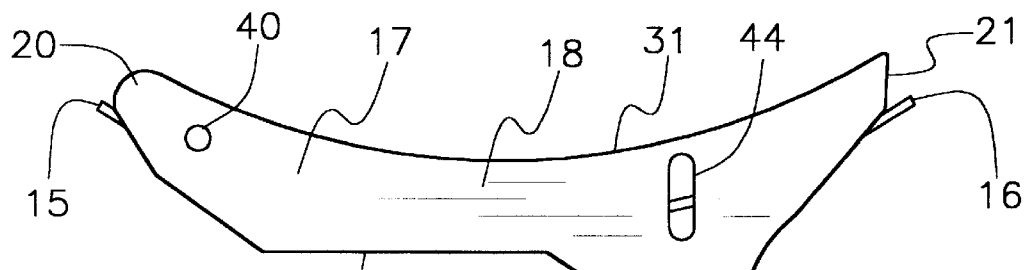
FIG. 6 is a schematic side view of the present invention as illustrated in FIG. 4.
Figure 7:
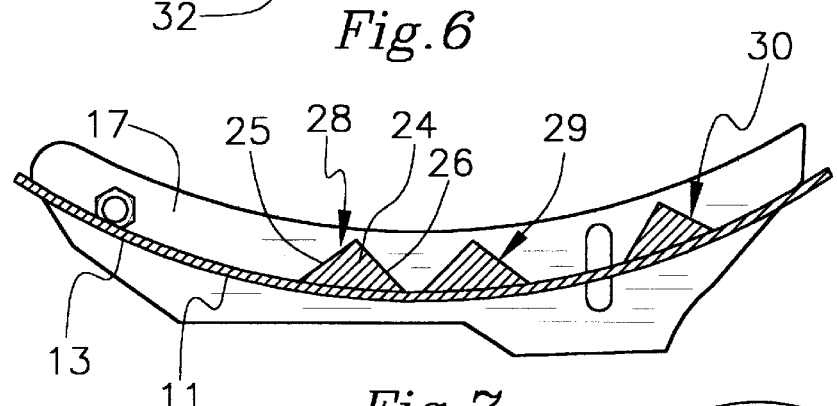
FIG. 7 is a schematic sectional view of the present invention taken along line 7—7 of FIG. 4.

With reference now to the drawings, and in particular to FIGS. 1 through 11 thereof, a new grain husk cracking plate embodying the principles and concepts of the present invention and generally designated by the reference numeral 10 will be described.

As particularly shown in FIGS. 1 through 7, the grain husk cracking plate 10 generally comprises a base plate 11 adapted for directing grain through a chopping cylinder housing 1 of the harvester. The base plate comprises a top surface 12, a bottom surface 13. a pair of opposite side edges 14. The base plate 11 comprises a leading edge 15 and a trailing edge 16 extending between the side edges. The base plate may have a substantially uniform thickness. The base plate is preferably arcuate, with the top surface 12 having a concave shape.

A pair of laterally spaced side mounting members 17 are provided. The mounting members are adapted for mounting the base plate 11 to the chopping cylinder housing 1 of the harvester. Each of the side mounting members comprises an exterior face 18 and an interior face 19. The interior face 19 of each of the mounting members is mounted to one of the side edges of the base plate. Each of the side mounting members comprises a first end 20 positioned toward, and may be located substantially adjacent to, the leading edge of the base plate. A second end 22 is positioned toward, and may be located substantially adjacent to, the trailing edge of the base plate.

A plurality of blade members 24 are provided for cracking the husk of grain traveling through the chopping cylinder housing striking the blade members. Each of the blade members preferably has a substantially triangular shape, with a forward edge 25, a rearward edge 26, and a pair of side faces 27. The forward edge of each of the blade members has a beveled shape along its length which is adapted for cracking the husk of grain striking the forward edge. Each of the blade members is mounted to the top surface of the base plate with the forward, or cutting, edge of each of the blade members being directed towards the leading edge of the base plate.

As shown in FIG. 4, the plurality of blade members may be arranged in a plurality of substantially linear rows extending between the side edges of the base plate. The plurality of rows may comprise a first row 28, a second row 29 and a third row 30. The first row 28 may have the blade members arranged such that the spacing distance between adjacent blade members in the first row are substantially equal. The second row 29 may have the blade members arranged such that the spacing distance between adjacent blade members in the second row are substantially equal, and the blade members have a laterally staggered arrangement with respect to the positions of the blade members of the first row. The third row 30 may have the blade members arranged such that the spacing distance between adjacent blade members in the third row are substantially equal and have a staggered arrangement with respect to the positions of the blade members of the first row and the blade members of the second row.

Significantly, the blade members are positioned on a rear portion of the base plate (see FIG. 4). which situates the blade members away from the shear bar 2 of the chopping cylinder housing 1 for effecting a more efficient and effective cracking of the kernels, as compared to blade members positioned on a front portion of the base plate and situated closer to the shear bar. The rear portion of the base plate extends between the trailing edge and a line approximately half the distance between the leading edge and the trailing edge of the base plate.

Each of the side mounting members may have an arcuate top edge 31, with a center of curvature of the top edge being substantially coincidental with the center of curvature of the top surface of the base plate. Each of the side mounting members also have a bottom edge 32 adjacent to the bottom surface 13 of the base plate 11. In a preferred embodiment of the invention, the side mounting members each have an arcuate shape with a substantially uniform width between the top edge 31 and the bottom edge 32.

Each of the side mounting members 17 is provided with a mounting structure for mounting the base plate to a grain harvester. Each of the mounting structures includes a first mounting aperture 40 extending through the side mounting member at the first end 20 adjacent to the leading edge 15 of the base plate 11. A second mounting aperture 41 extends through the side mounting member at the second end 22 adjacent to the trailing edge 16 of the base plate. Each of the mounting structures preferably includes a fastener 43 that is attached to the side mounting member (such as, by example, by welding) and has a hole positioned in communication with the respective mounting aperture. The fastener preferably has internal threads for receiving an exteriorly-threaded fastener passing through the aperture for permitting easy installation and removal of the base plate on a harvester using a threaded bolt (not shown). Illustratively, the threaded fastener may comprise a nut mounted against the interior face of the side mounting member.

An optional embodiment of the side mounting members does not include the does not include the mounting aperture 41. In the optional embodiment, each of the side mounting members includes a first notch 42 formed in the side edge 14 of the base plate adjacent to the mounting aperture 40 for providing clearance for a portion of an externally threaded fastener (such as, for example, a bolt not shown) extending through the mounting aperture. Each of the mounting structures further includes a mounting slot 44. The mounting slot 44 has a longitudinal axis that is oriented substantially perpendicular to the top surface 12 of the base plate 11. The leading edge 15 and the trailing edge 16 of the base plate define a first distance therebetween, and the mounting slot 44 of each of the mounting structures may be located approximately two thirds to three quarters of the first distance away from the leading edge 15. Each of the mounting structures may include a second notch 44 formed in the side edge of the base plate in a location adjacent to the mounting slot for providing clearance for a portion of a fastener (not shown) extending through the mounting slot 44.

Figure 9:
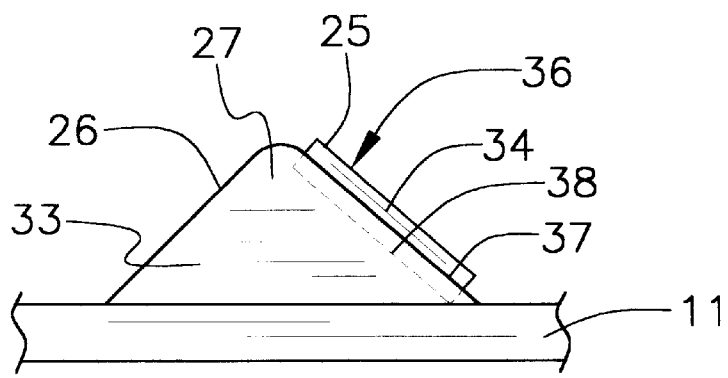
FIG. 9 is a schematic side view of an optional configuration of the blade members of the present invention shown in relation to a broken away portion of the base plate.
Figure 10:
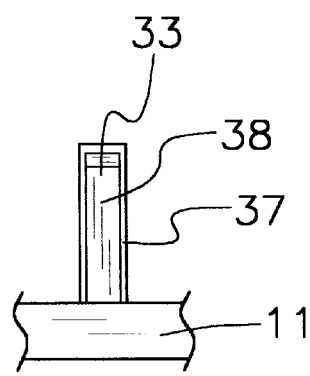
FIG. 10 is a schematic front view of the optional blade assembly of FIG. 9 particularly illustrating the forward surface of the base member of the blade assembly.
Figure 11:
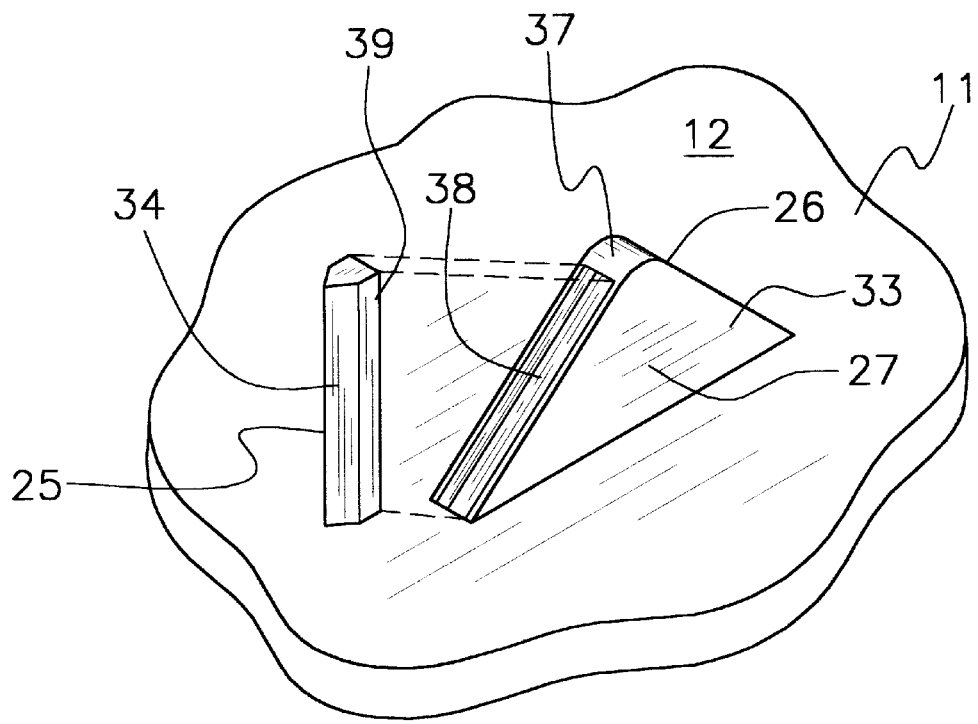
FIG. 11 is a schematic perspective view of the blade assembly of FIG. 9 with the edge member and base member of the blade assembly shown in an exploded condition.

Another significant feature of the invention is an optional embodiment of the blade members is particularly illustrated in FIGS. 9 through 11, in which each of the blade members comprises a blade assembly 36. Each of the blade assemblies 36 comprises a base member 33 and an edge member 34. The base member 33 has a forward surface 37. The edge member 34 is mounted on the forward surface 37 to form the forward edge 25 of the blade assembly. The forward surface 37 of the base member preferably has a depression formed therein. The depression may have a substantially rectangular perimeter shape, and may have a substantially flat lower face 38. The edge member 34 has a rear portion 39 that may be substantially flat for being received in the depression of the base member and being abutted against the lower face 38. The edge member 34 of each of the blade assemblies has a beveled shape along its length which is adapted for contacting and cracking the husk of grain flowing through the grain path of the harvester.

Significantly, the edge member 34 of each blade assembly is formed of a material with relatively greater hardness than the material of the base member 33. This feature of the invention permits the use of a harder and more durable material to be used to form the cutting edge of the blade member which receives the greatest part of the wear of the blade member. The harder and more durable material of the edge member is thus limited to the cutting edge area of the blade member, which is highly beneficial for the economy of manufacture of the cracking plate since the relatively harder material of the edge member is often more expensive than the relatively softer material used for the base member. The relatively harder material is often more brittle, and the blade member would be vulnerable to cracking or breakage if the blade member were entirely comprised of the relatively harder material. Preferably, the edge member of each blade assembly comprises a carbide material. Illustratively, the base member of each blade assembly comprises an iron or steel material. The carbide material is preferably mounted on the base member using a brazing material.

Figure 8:
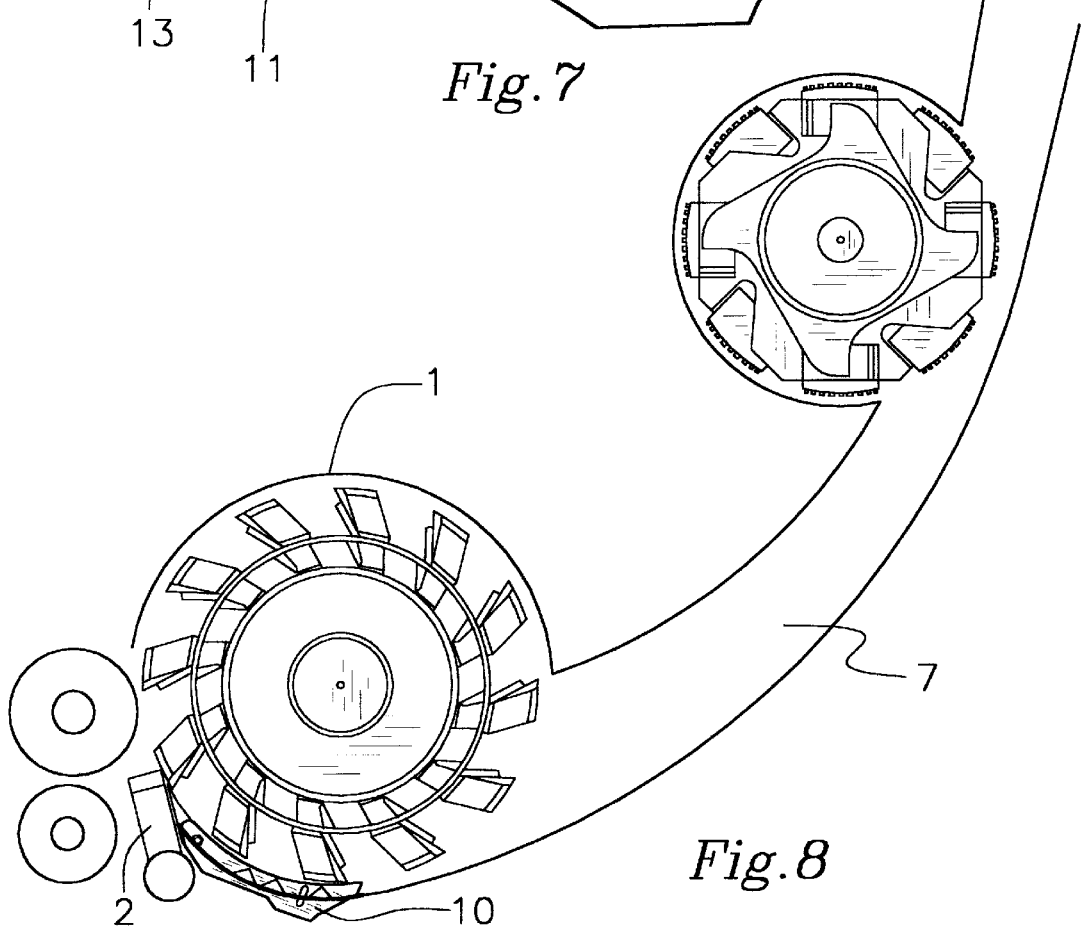
FIG. 8 is a schematic side view of a grain path of a grain harvester with the cracking plate of the present invention shown in relation to the cutting cylinder of the harvester.

In use, as shown in FIG. 8, the grain husk cracking plate is mounted in a harvester behind the shear bar and under the cutting cylinder. As grain is harvested, the grain is moved by the shear bar and past the rotating cutting head. This movement does not reliably and completely crack the husk on all the grain. The rotating cutting head forces the grain to move past the grain husk cracking plate of the invention installed along the grain path 7, and the grain strikes the blades. The grain husk is either cracked or sliced open thus improving the amount of nutrients from the grain that is available for digestion by livestock consuming the grain. The amount of digestible grain is therefore increased, and thus lowering the amount grain necessary to keep livestock at a desired weight.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A grain husk cracking plate for attaching to a chopping cylinder housing of a harvester in proximity to a shear bar to crack husks of grain moving through said harvester, the grain husk cracking plate comprising:

a base plate adapted for directing grain through the chopping cylinder housing of the harvester, said base plate having a top surface, a bottom surface, a pair of opposite side edges, and a leading edge and a trailing edge extending between said side edges;

a pair of laterally spaced side mounting members adapted for mounting to the chopping cylinder housing of the harvester, each of said side mounting members having an exterior face and an interior face, said interior face of each mounting member being mounted to one of said side edges of said base plate, each of said side mounting members having a first end positioned toward said leading edge of said base plate and a second end positioned toward said trailing edge of said base plate; and a plurality of blade members mounted on said top surface of said base plate for cracking the husk of grain traveling through the chopping cylinder housing and striking said blade members;

wherein each of said side mounting members has a pair of mounting structures for mounting said base plate to a grain harvester, a first one of the pair of said mounting structures including a first mounting aperture extending through said side mounting member adjacent to said leading edge of said base plate, a second one of the pair of mounting structures including a second mounting aperture extending through said side mounting member adjacent to said trailing edge of said base plate.

2. The grain husk cracking plate of claim 1 wherein each of said mounting structures includes a threaded fastener coupled to each of the side mounting members and having a hole in communication with the mounting aperture.

3. The grain husk cracking plate of claim 2 wherein each of the threaded fasteners is positioned on the interior face of one of said side mounting members.

4. The grain husk cracking plate of claim 1 wherein the first mounting aperture is located adjacent to the first end of the side mounting member and the second mounting aperture is located adjacent to the second end of the side mounting member.

5. The grain husk cracking plate of claim 1 wherein each of the side mounting members has a substantially uniform width between the first and second ends of said side mounting member.

6. The grain husk cracking plate of claim 1 wherein said plurality of blade members are positioned on a rear portion of said base plate, said rear portion extending between said trailing edge and a line approximately half the distance between said leading edge and said trailing edge.

7. The grain husk cracking plate of claim 1 wherein said plurality of blade members are arranged in a plurality of substantially linear rows extending between said side edges of said base plates, said rows being oriented substantially parallel to said leading and trailing edges.

8. The grain husking plate of claim 6 wherein said plurality of rows comprises a first row, a second row, and a third row, and wherein said first row comprises a number of blade members arranged such that the distance between adjacent blade members in said first row are substantially equal, said second row comprises a number of blade members arranged such that the distance between adjacent blade members in said second row are substantially equal, and said third row comprises a number of blade members arranged such that the distance between adjacent blade members in said third row are substantially equal.

9. The grain husking plate of claim 8 wherein the blade members of said second row have a laterally staggered arrangement with respect to the positions of said blade members of said first row, and the blade members of said third row have a staggered arrangement with respect to the positions of said blade members of said first row and said blade members of said second row.

10. A grain husk cracking plate for attaching to a chopping cylinder housing of a harvester in proximity to a shear bar to crack husks of grain moving through said harvester, the grain husk cracking plate comprising:

a base plate adapted for directing grain through the chopping cylinder housing of the harvester, said base plate having a top surface, a bottom surface, a pair of opposite side edges, and a leading edge and a trailing edge extending between said side edges; and a plurality of blade assemblies mounted on said top surface of said base plate for cracking the husk of grain traveling through the chopping cylinder housing and striking said blade assemblies, each of said blade assemblies having a forward edge directed toward said leading edge of said base plate, a rearward edge directed toward said trailing edge of said base plate, and a pair of side faces;

wherein each of said blade assemblies comprises a base member and an edge member, said base member having a forward surface with said edge member mounted thereon to form said forward edge of said blade assembly.

11. The grain husk cracking plate of claim 10 wherein the forward surface of said base member has a depression, said edge member having a rear portion received in the depression of said base member.

12. The grain husk cracking plate of claim 10 wherein said edge member of each of said blade assemblies has a beveled shape along its length adapted for cracking the husk of grain.

13. The grain husk cracking plate of claim 10 wherein the edge member of each blade assembly is formed of a material with relatively greater hardness than the base member.

14. The grain husk cracking plate of claim 10 wherein the edge member of each blade assembly comprises a carbide material.

15. The grain husk cracking plate of claim 14 wherein the base member of each blade assembly comprises an iron material.

16. The grain husk cracking plate of claim 10 additionally comprising a pair of laterally spaced side mounting members adapted for mounting to the chopping cylinder housing of the harvester, each of said side mounting members having an exterior face and an interior face, said interior face of each mounting member being mounted to one of said side edges of said base plate, each of said side mounting members having a first end positioned toward said leading edge of said base plate and a second end positioned toward said trailing edge of said base plate, wherein each of said side mounting members has a pair of mounting structures for mounting said base plate to a grain harvester, a first one of the pair of said mounting structures including a first mounting aperture extending through said side mounting member adjacent to said leading edge of said base plate, a second one of the pair of mounting structures including a second mounting aperture extending through said side mounting member adjacent to said trailing edge of said base plate.

17. The grain husk cracking plate of claim 16 wherein each of said mounting structures includes a threaded fastener coupled to each of the side mounting members and having a hole in communication with the mounting aperture.

18. The grain husk cracking plate of claim 17 wherein each of the threaded fasteners is positioned on the interior face of one of said side mounting members.

19. The grain husk cracking plate of claim 16 wherein the first mounting aperture is located adjacent to the first end of the side mounting member and the second mounting aperture is located adjacent to the second end of the side mounting member.

20. The grain husk cracking plate of claim 16 wherein each of the side mounting members has a substantially uniform width between the first and second ends of said side mounting member.

* * * * *